United States Patent
Suzuki et al.

(10) Patent No.: US 7,973,090 B2
(45) Date of Patent: Jul. 5, 2011

(54) PROCESS FOR PRODUCTION OF ZEOLITE FILM

(75) Inventors: Kenji Suzuki, Nagoya (JP); Shinji Nakamura, Kasugai (JP); Miyuki Yabuki, Nagoya (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 664 days.

(21) Appl. No.: 12/118,911

(22) Filed: May 12, 2008

(65) Prior Publication Data

US 2008/0214686 A1     Sep. 4, 2008

Related U.S. Application Data

(63) Continuation of application No. PCT/JP2006/323522, filed on Nov. 17, 2006.

(30) Foreign Application Priority Data

Nov. 17, 2005 (JP) ................. 2005-332534

(51) Int. Cl.
*C08J 5/20* (2006.01)

(52) U.S. Cl. ............ 521/27; 210/500.21; 264/41

(58) Field of Classification Search ............ 521/27; 210/500.21; 264/41
See application file for complete search history.

(56) References Cited

U.S. PATENT DOCUMENTS 5,871,650 A * 2/1999 Lai et al. ............ 210/653

FOREIGN PATENT DOCUMENTS

| JP | 08-257302 A1 | 10/1996 |
|---|---|---|
| JP | 08257302 A * | 10/1996 |
| JP | 10-036114 A1 | 2/1998 |
| JP | 10-502609 A1 | 3/1998 |
| JP | 2000-026115 A1 | 1/2000 |
| JP | 2002-018247 A1 | 1/2002 |
| JP | 2002-201020 A1 | 7/2002 |
| JP | 2004-082008 A1 | 3/2004 |
| JP | 2004-307296 A1 | 11/2004 |

OTHER PUBLICATIONS

U.S. Appl. No. 12/118,929, filed May 12, 2008, Yabuki et al.

* cited by examiner

*Primary Examiner* — Michael M Bernshteyn
(74) *Attorney, Agent, or Firm* — Burr & Brown (57) ABSTRACT

A process for producing a zeolite membrane comprising a seed crystal forming step of placing, in a pressure-resistant vessel, a seeding sol containing silica, water and a structure-directing agent and a support in a state that the support is immersed in the seeding sol and heating the heat-resistant vessel to form a zeolite seed crystal on the surface of the support, and a membrane formation step of allowing the zeolite seed crystal to grow to form a zeolite membrane on the surface of the support. In the seed crystal forming step, the molar ratio of water/silica in the seeding sol is set 10 to 50 and the heating of the pressure-resistant vessel is conducted at 90 to 130° C. The crystal c-axis of the present zeolite membrane is oriented in a direction vertical to the surface of the support and its thickness is uniform.

8 Claims, 11 Drawing Sheets

PROCESS FOR PRODUCTION OF ZEOLITE FILM

TECHNICAL FIELD

The present invention relates to a process for producing a zeolite membrane. More particularly, the present invention relates to a process for producing a zeolite membrane, which can produce a zeolite membrane whose crystal c-axis is oriented in a direction vertical to the surface of the support and whose thickness is uniform.

BACKGROUND ART

Zeolite is a kind of silicate having a reticulate crystal structure in which fine pores of uniform diameter are formed. It is known that zeolite has various chemical compositions represented by a general formula of $WmZnO_2n \cdot sH_2O$ (W: sodium, potassium, calcium or the like; Z: silicon, aluminum or the like; s: various values) and has crystal structures of many kinds (types) different in pore shape. These zeolites have inherent absorbabilities, catalytic activities, solid acid characteristics, ion exchange abilities, etc. based on respective chemical compositions and crystal structures, and are used in various applications such as adsorbent, catalyst, catalyst carrier, gas separation membrane, and ion exchanger.

An MFI type zeolite, for example, is a zeolite having pores of about 0.5 nm formed by the oxygen-containing ten-membered ring in the crystal and is used generally in applications such as adsorbent for adsorbing harmful substances present in automobile exhaust gas, such as nitrogen oxides ($NO_x$), hydrocarbons (HC) and the like, catalyst for decomposing such harmful substances, and the like.

Zeolite is ordinarily powdery or particulate. In order to use zeolite in the form of a separation membrane, there is being developed methods for forming a zeolite membrane. A zeolite membrane is obtained, for example, by subjecting zeolite raw materials to a hydrothermal synthesis to precipitate zeolite crystals on the surface of a support in a membrane state. Here, the hydrothermal synthesis refers to a method for heating zeolite raw materials in the presence of water (steam) under given conditions to synthesize zeolite.

In such production of a zeolite membrane, mere hydrothermal synthesis in the presence of a support has had problems of exposure of support surface and too large membrane thickness (which made difficult the formation of dense and thin membrane). There were disclosed methods for solving the above problems by coating a seed crystal on the surface of a support (see, for example, patent literatures 1 to 3).

There were also disclosed methods of immersing a support in an aqueous solution containing zeolite raw materials, to precipitate a seed crystal on the surface of the support (see, for example, patent literatures 4 and 5).

Patent literature 1: JP-A-H10-36114
Patent literature 2: JP-A-2002-201020
Patent literature 3: JP-A-2004-82008
Patent literature 4: JP-A-2004-307296
Patent literature 5: JP-A-2000-26115

DISCLOSURE OF THE INVENTION

In the methods for production of zeolite membrane, described in the above patent literatures 1 to 3, rubbing, dip coating, etc. are used in order to adhere a zeolite seed crystal on a support. In these methods, however, uniform adhesion of zeolite seed crystal on support surface was difficult and was very difficult especially in the case of a support having a large surface area. It was also very difficult to adhere a zeolite seed crystal in a uniform thickness on the inner surfaces of pores of a monolithic support or on the surface of a support of complicated shape such as spiral shape or the like. Thus, when a zeolite seed crystal adheres onto a support non-uniformly, the zeolite membrane obtained by a hydrothermal synthesis has a non-uniform thickness, which caused, in some cases, defects (e.g. cracks) in the zeolite membrane when an activation treatment (e.g. drying and firing) was conducted after the hydrothermal synthesis. Therefore, in these methods, formation of a zeolite membrane having a high separation ability, at good reproducibility was difficult and the efficiency of zeolite membrane production was very inferior. Such a zeolite membrane of non-uniform thickness may cause strain and cracks therein when used, for example, at high temperatures.

Also, in the above-mentioned methods of adhering a zeolite seed crystal on a support by dip coating, etc., the zeolite seed crystal adhered on the support is low in adhesivity to support and, during hydrothermal synthesis, flows into a membrane-forming sol containing zeolite raw materials, to cause the compositional change of the membrane-forming sol. Therefore, it was very difficult to control the thickness of zeolite membrane at an intended level.

In addition to the above-mentioned methods of adhering a zeolite seed crystal to a support by dip coating, etc., there were disclosed, in the patent literatures 4 and 5, methods of immersing a support in an aqueous solution containing zeolite raw materials, to precipitate a zeolite seed crystal on the surface of the support. In the method of the patent literature 4, since a zeolite seed crystal is precipitated on the surface of a support by a hydrothermal synthesis, uniform precipitation on support surface is possible but the b-axis of crystal is oriented in a direction vertical to the surface of support. Therefore, this method is not applicable when other axis, for example, c-axis is intended to be oriented in a direction vertical to the surface of support. In the method of the patent literature 5, the silica concentration in zeolite raw materials is too low when a zeolite seed crystal is adhered to a support, which made difficult the precipitation of crystal.

The present invention has been made in view of the above problems, and is characterized by providing a process for producing a zeolite membrane, which can produce a zeolite membrane whose crystal c-axis is oriented in a direction vertical to the surface of the support and whose thickness is uniform.

In order to achieve the above aim, the present invention provides the following process for producing a zeolite membrane.

[1] A process for producing a zeolite membrane, which comprises
a seed crystal forming step of placing, in a pressure-resistant vessel, a seeding sol containing silica, water and a structure-directing agent and a support in a state that the support is immersed in the seeding sol and heating the heat-resistant vessel to form a zeolite seed crystal on the surface of the support, and
a membrane formation step of allowing the zeolite seed crystal to grow to form a zeolite membrane on the surface of the support,
wherein, in the seed crystal forming step, the molar ratio of water/silica in the seeding sol is set at water/silica=10 to 50 and the heating of the pressure-resistant vessel is conducted at 90 to 130° C.

[2] A process for producing a zeolite membrane according to [1], wherein, in the seed crystal forming step, the pressure-resistant vessel is heated for 3 to 18 hours.

[3] A process for producing a zeolite membrane according to [1] or [2], wherein, in the seed crystal forming step, the zeolite seed crystal obtained has particle diameters of 1 μm or less.

[4] A process for producing a zeolite membrane according to any of [1] to [3], wherein the zeolite membrane has a thickness of 1 to 30 μm.

[5] A process for producing a zeolite membrane according to any of [1] to [4], wherein the zeolite membrane is composed of an MFI type zeolite.

[6] A process for producing a zeolite membrane according to any of [1] to [5], wherein the crystal c-axis of the zeolite membrane is oriented to a direction vertical to the surface of the support.

[7] A process for producing a zeolite membrane according to any of [1] to [6], wherein the support is a columnar, porous material in which a plurality of channels are formed in parallel in the axial direction and the seed crystal forming step is a step of forming a zeolite seed crystal on the surfaces of the channels.

[8] A process for producing a zeolite membrane according to any of [1] to [7], which comprises, after the membrane formation step, at least one step for membrane growth which allows the zeolite membrane formed on the surface of the support, to grow further.

In the present process for producing a zeolite membrane, in the seed crystal forming step of precipitating a zeolite seed crystal on the surface of a support by a hydrothermal synthesis, the molar ratio of water/silica in the seeding sol is set at water/silica=10 to 50 and the heating of the pressure-resistant vessel is conducted at a temperature of from 90 to 130° C. Therefore, a zeolite seed crystal of small particle diameter can be adhered to the surface of a support densely and uniformly, enabling formation of a zeolite membrane which has a uniform thickness, is dense and is low in defects. In the zeolite membrane obtained, the crystal c axis is oriented in a direction vertical to the surface of a support.

BRIEF DESCRIPTION OF THE DRAWINGS

FIG. 10 shows an embodiment (monolithic shape) of the support used in the present process for producing a zeolite membrane. FIG. 10(*a*) is a perspective view and FIG. 10(*b*) is a sectional view.

EXPLANATION OF SYMBOLS 1, 1*a*, 1*b* and 1*c* are each an MFI type zeolite crystal; 2 is an abc crystal axis system; 3 is a surface of a support; 4*a*, 4*b* and 4*c* are each a c-axis; 11 is a pressure-resistant vessel; 12 is an alumina support; 13 is a seeding sol; 13' is a membrane-forming sol; 14 is a fluoroplastic-made inner cylinder; 15 and 16 are each a fixation jig; 21 is a zeolite seed crystal; 22 is a zeolite membrane; 31 is a raw material tank; 32 is a feeding pump; 33 is a feed solution inlet; 34 is a feed solution outlet; 35 is an SUS-made module; 36 is a raw material side space; 37 is a space behind membrane support; 38 is a zeolite membrane; 39 is a flow meter; 40 is an outlet for vapor after permeation; 41 is a liquid nitrogen trap; 42 is a pressure regulator; 43 is a vacuum pump; 51 is a support; 52 is a channel; 53 is an axial direction; 54 is a porous material; 61 is a pressure-resistant vessel; 62 is an inner cylinder; 63 is a stainless steel vessel; 64 is a fixation jig; 65 is a support; and 66 is a seeding sol (a membrane-forming sol).

BEST MODE FOR CARRYING OUT THE INVENTION

The best mode for carrying out the present invention is described below specifically. However, the present invention is in no way restricted to the following embodiment and it should be construed that design change, improvement, etc. can be made appropriately based on the ordinary knowledge possessed by those skilled in the art unless there is no deviation from the gist of the present invention.

The present process for producing a zeolite membrane is described specifically mainly on a case of MFI type zeolite. However, since the present process for producing a zeolite membrane is characterized by adhering a zeolite seed crystal appropriately on a support, the present process can naturally be applied also to conventional known zeolites other than MFI type, such as LTA, MOR, AFI, BEA, FER, FAU, DDR and the like.

The present process for producing a zeolite membrane is a process for producing a zeolite membrane, which comprises a seed crystal forming step of placing, in a pressure-resistant vessel, a seeding sol containing silica, water and a structure-directing agent and a support in a state that the support is immersed in the seeding sol and heating the heat-resistant vessel to form a zeolite seed crystal on the surface of the support, and a membrane formation step of allowing the zeolite seed crystal to grow to form a zeolite membrane on the surface of the support, wherein, in the seed crystal forming step, the molar ratio of water/silica in the seeding sol is set at water/silica=10 to 50 and the heating of the pressure-resistant vessel is conducted at 90 to 130° C.

(1) Seed Crystal Forming Step (1-1) Seeding Sol

The seeding sol used in the present process for producing a zeolite membrane is a silica sol in which fine silica particles are dispersed in water, and contains therein at least a structure-directing agent. This seeding sol is obtained by mixing a silica sol of given concentration, water for concentration adjustment, and an aqueous solution containing a given concentration of a structure-directing agent, at given amounts. This seeding sol is crystallized, by a hydrothermal treatment described later, into a zeolite having a structure in which silica atoms derived from the silica sol surround the circumference of the molecule of the structure-directing agent. The structure-directing agent is removed from the above structure by a heat treatment described later, whereby is formed a zeolite crystal having pores of specific shape determined by the structure-directing agent.

As the silica sol, there can be preferably used a commercial silica sol [for example, Snowtex S (trade name), a product of Nissan Chemical Industries, ltd., solid content: 30 mass %]. Here, the solid refers to silica. There may also be used a silica sol obtained by dissolving a fine silica powder in water, or a silica sol obtained by hydrolyzing an alkoxysilane.

In the seeding sol, the molar ratio of contained water and silica (fine particles) (water/silica molar ratio: a value obtained by diving the moles of water by the moles of silica) is preferably water/silica=10 to 50, more preferably 20 to 40. By thus setting the silica concentration in seeding sol at a high level, it is possible to adhere a zeolite seed crystal on the surface of a support in the form of fine particles. When the water/silica molar ratio is smaller than 10, the zeolite seed crystal may precipitate on the surface of a support non-uniformly and excessively. When the molar ratio is larger than 50, there may be no precipitation of zeolite seed crystal on the surface of a support. Here, the state in which the zeolite seed crystal adheres to the surface of a support, can be indicated quantitatively in, for example, a scanning electron microscope (SEM) photograph, as a proportion of crystal-covered area in support surface (a covered area proportion in photograph). The proportion of covered area is preferably 5 to 100%.

As the structure-directing agent for MFI type zeolite, there can be used tetrapropylammonium hydroxide (TPAOH) and tetrapropylammonium bromide (TPABr), both capable of generating tetrapropylammonium ion (TPA). Therefore, as the aqueous solution of structure-directing agent, there can be preferably used an aqueous solution containing TPAOH and/or TPABr.

As the silica sol, there is also used preferably a sol containing, besides fine silica particles, a hydroxide of alkali metal or alkaline earth metal. Although the TPAOH used as a structure-directing agent for MFI type zeolite is a relatively expensive reagent, there can be used, in this method, a TPA source and a an alkali source, which are obtained from TPABr of relatively low cost and a hydroxide of alkali metal or the like. Therefore, in this method, the use amount of expensive TPAOH can be lowered, which allows for a reduction in raw material cost as well as for inexpensive production of zeolite.

The mixing of the silica sol and the structure-directing agent is conducted in a molar ratio of TPA relative to silica (TPA/silica ratio), of preferably 0.05 to 0.5, more preferably 0.1 to 0.3. When the TPA/silica ratio is less than 0.05, there may be no precipitation of seed crystal; were the TPA/silica ratio is more than 0.5, there may be excessive precipitation of seed crystal on the surface of support.

Incidentally, the substance used as the structure-directing agent differs depending upon the type of zeolite formed; therefore, a structure-directing agent corresponding to the desired type of zeolite is selected appropriately and used. For example, when a BEA type zeolite (called also as "β-zeolite") is formed, there is used tetraethylammonium hydroxide (TEAOH), tetraethylammonium bromide (TEABr) or the like; when a DDR type zeolite is formed, 1-adamantanamine or the like is used. The molar ratio of structure-directing agent relative to silica (structure-directing agent/silica ratio) may be determined based on the known synthesis method for the zeolite type to be formed.

The water added in preparation of seeding sol is preferred to contain no impurity ion and be specifically distilled water or ion-exchanged water.

1-2) Support

Figure 10A:
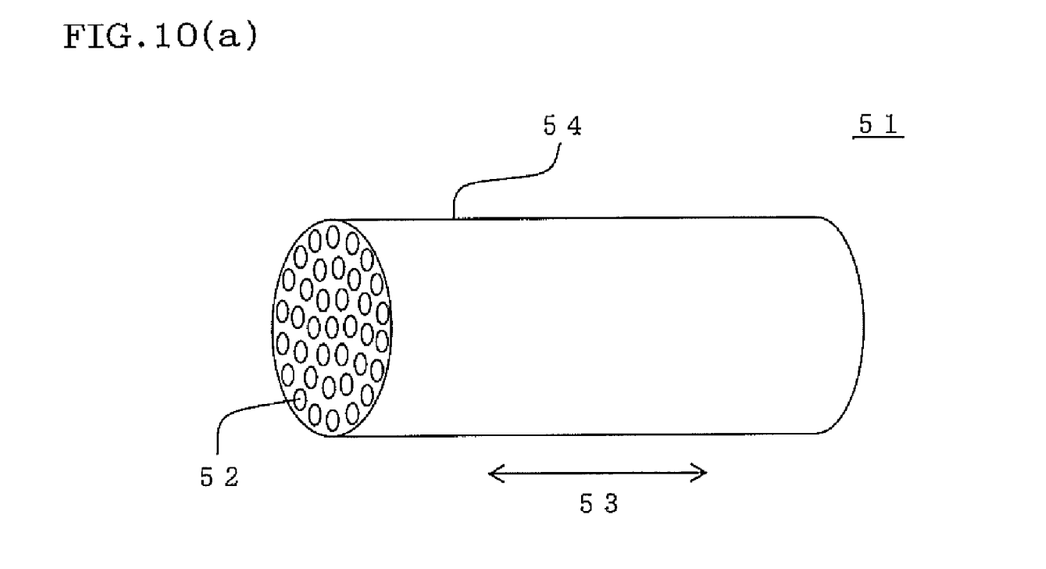
Figure 10B:
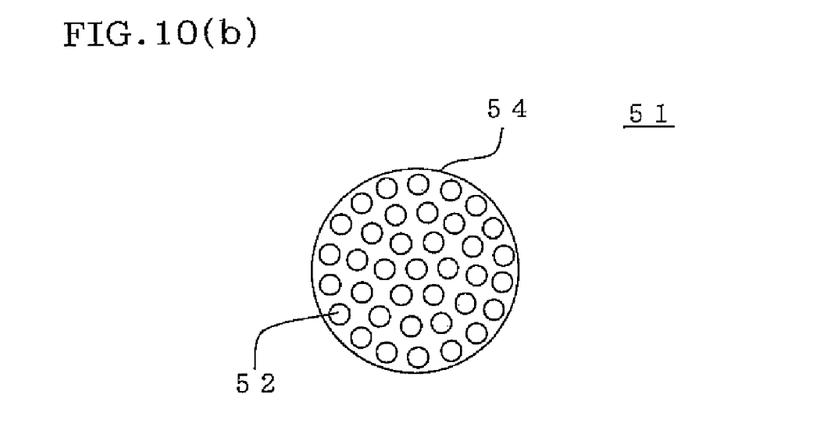

As to the support, there is no particular restriction as long as it allows for forming of zeolite seed crystal thereon and subsequent formation of zeolite membrane. The material, shape and size of the support can be appropriately determined depending upon the application of the zeolite membrane formed, etc. As the material constituting the support, there can be mentioned ceramics such as alumina (e.g. α-alumina, γ-alumina and anode oxidation alumina), zirconia and the like; metals (e.g. stainless steel); and so forth. Alumina is preferred from the standpoint of easiness of support production or easiness of alumina procurement. As the alumina, there is preferred one obtained by molding and sintering of alumina particles (raw material) having an average particle diameter of 0.001 to 30 μm. The support is preferably porous. The shape of the support may be any of plate, circular cylinder, tube of polygonal section, monolithic shape, spiral shape, etc., but a monolithic shape is preferred. Here, the monolithic shape refers to a circular cylinder such as shown in FIGS. 10(a) and 10(b), wherein a plurality of channels 52 are formed in parallel in the axial direction 53. FIG. 10 shows an embodiment (monolithic shape) of the support used in the present process for production of zeolite membrane, wherein FIG. 10(a) is a perspective view and FIG. 10(b) is a sectional view. The support 51 is particularly preferably a porous material 54 of monolithic shape. A support composed of such a porous material of monolithic shape can be obtained by a known production method such as extrusion molding or the like.

(1-3) Forming of Zeolite Seed Crystal

In order to form a zeolite seed crystal, first, the support and the seeding sol are put in a pressure-resistant vessel. In this case, the support is arranged so as to be immersed in the seeding sol. Then, the pressure-resistant vessel is heated to give rise to a hydrothermal synthesis to form a zeolite seed crystal on the surface of the support.

As the pressure-resistant vessel, there is no particular restriction. However, there can be used, for example, a stainless steel-made pressure-resistant vessel having a fluoroplastic-made inner cylinder or a nickel metal-made pressure-resistant vessel. When the support is immersed in the seeding sol, it is preferred that at least the portion of the support on which a zeolite seed crystal is precipitated, is immersed in the seeding sol, or the whole support may be immersed in the seeding sol. The temperature at which a hydrothermal synthesis is conducted, is 90 to 130° C., preferably 100 to 120° C. When the temperature is lower than 90° C., the hydrothermal synthesis is unlikely to proceed and, when the temperature is higher than 130° C., it is impossible to obtain a zeolite seed crystal in state of fine particles. Particularly when the support is a porous material obtained by sintering of alumina particles, setting of the hydrothermal synthesis temperature at the above range (90 to 130° C. makes it possible to cover the surface of each alumina particle present on the surface of the support with the zeolite seed particle. The time of the hydrothermal synthesis is preferably 3 to 18 hours, more preferably 6 to 12 hours. When the hydrothermal synthesis time is shorter than 3 hours, the hydrothermal synthesis may not proceed sufficiently and, when the time is longer than 18 hours, the zeolite seed crystal formed may be too large. By thus precipitating the zeolite seed crystal directly on the surface of the support by hydrothermal synthesis, the zeolite seed crystal obtained is hardly peeled from the support; therefore, when a zeolite membrane is formed thereon, problems such as defect of membrane, non-uniformity of membrane thickness, and the like can be prevented.

As the method for heating, there can be mentioned, for example, a method of putting a pressure-resistant vessel in a hot-air dryer to conduct heating, and a method of fixing a heater directly to a pressure-resistant vessel to conduct heating.

The particle diameter of the zeolite seed crystal obtained is preferably 1 μm or less, more preferably 0.5 μm or less, particularly preferably 0.01 to 0.5 μm. When the particle diameter is larger than 1 μm, it may be impossible to form, in the membrane formation step, a membrane which has little defects, has a uniform thickness and is dense. Here, the particle diameter of the zeolite seed crystal is a value obtained by observation using a scanning electron microscope (SEM), and a particle diameter of 1 μm or less refers to that the maximum particle diameter is 1 μm or less.

After the precipitation of the zeolite seed crystal on the surface of the support, the support is preferably washed in boiling water. Thereby, formation of excessive zeolite can be prevented. The time of washing is not particularly restricted as long as the seeding sol can be washed away; however, it is preferred to repeat washing of 0.5 to 3 hours 1 to 5 times. After the washing, drying is preferably conducted at 60 to 120° C. for 4 to 48 hours.

When there is used, as the support, a monolithic, porous material 54 shown in FIGS. 10(*a*) and 10(*b*), it is preferred to form a zeolite seed crystal on the surfaces of the channels 52 of a support 51. In this case, when the support 51 is immersed in a seeding sol, the immersion is preferably conducted in a state that the outer wall surface of the support has been covered with a tape made of a fluoroplastic resin or the like.

(2) Membrane Formation Step
(2-1) Membrane-Forming Sol

The membrane-forming sol is preferably a sol which uses the same raw materials as in the seeding sol, i.e. a silica sol, a structure-directing agent and water and wherein the water is used in a larger amount than in the seeding sol and resultantly the concentration is lower than in the seeding sol.

In the membrane-forming sol, the molar ratio of the contained water and the silica (fine particles), i.e. the water/silica molar ratio is preferably water/silica=100 to 700, more preferably 200 to 500. When the water/silica molar ratio is 100 to 700, there can be formed a zeolite membrane which has a uniform thickness, has little defects, and is dense. When the water/silica molar ratio is smaller than 100, the silica concentration is high, a zeolite crystal settles out in the membrane-forming sol and is precipitated on the surface of the zeolite membrane formed; therefore, cracks, etc. may easily appear during the activation treatment (e.g. firing). When the water/silica molar ratio is larger than 700, the zeolite membrane may not be dense.

With respect to the membrane-forming sol, the mixing of the silica sol and the aqueous solution of structure-directing agent is conducted so that the molar ratio of TPA to silica (TPA/silica ratio) is in a range of preferably 0.01 to 0.5, more preferably 0.02 to 0.3. When the TPA/silica ratio is less than 0.01, the membrane is hardly dense and, when the ratio is more than 0.5, there may be deposition of zeolite crystal on the membrane.

(2-2) Membrane Formation

The zeolite seed crystal precipitated on the surface of the support is allowed to grow by a hydrothermal synthesis, whereby a zeolite membrane composed of zeolite crystals grown in a film shape is formed on the surface of the support. In order to form a zeolite membrane on the surface of the support, first, there are placed, in a pressure-resistant vessel, the support having a zeolite seed crystal precipitated thereon and the above-mentioned membrane-forming sol, as in the above-mentioned case of forming (precipitating) a zeolite seed crystal. At this time, the support is arranged so as to be immersed in the membrane-forming sol. Then, the pressure-resistant vessel is heated to give rise to a hydrothermal synthesis to form a zeolite membrane on the surface of the support. Incidentally, since the zeolite membrane obtained by the hydrothermal synthesis contains tetrapropylammonium, a heat treatment is preferably conducted after the membrane formation, in order to obtain a final zeolite membrane.

As the pressure-resistant vessel, there is preferably used the same pressure-resistant vessel as used in the forming of zeolite seed crystal. When the support is immersed in the membrane-forming sol, it is preferred that at least the portion of the support on which a zeolite membrane is to be formed, is immersed in the membrane-forming sol. The whole support may be immersed in the membrane-forming sol. The temperature at which the hydrothermal synthesis is conducted, is preferably 100 to 200° C., more preferably 120 to 180° C. By employing such a temperature range, there can be obtained a zeolite membrane which has a uniform thickness, has little defects and is dense. In the present process for production of zeolite membrane, a membrane of such high quality can be produced at a good reproducibility and the production efficiency is high. When the temperature is lower than 100° C., the hydrothermal synthesis may proceed hardly and, when the temperature is higher than 200° C., there may be hardly obtained a zeolite membrane which has a uniform thickness, has little defects and is dense. The time of the hydrothermal synthesis is preferably 3 to 120 hours, more preferably 6 to 90 hours, particularly preferably 10 to 72 hours. When the time is shorter than 3 hours, the hydrothermal synthesis may not proceed sufficiently and, when the time is longer than 120 hours, the zeolite membrane obtained may have a non-uniform and too large thickness. Here, dense zeolite membrane refers to a state that, when observation is made by a scanning electron microscope (SEM) there is no exposure of support surface. The defects of zeolite membrane can be examined, for example, by coating a coloring agent (e.g. a Rhodamine B solution) on the surface of the support, quickly conducting water-washing, and observing the remaining color visually. Little defects refer to a state that there is substantially no remaining color.

The thickness of the zeolite membrane obtained is preferably 30 μm or less, more preferably 1 to 30 μm, further preferably 1 to 20 μm, particularly preferably 1 to 15 μm, most preferably 1 to 10 μm. When the thickness is larger than 30 μm, the zeolite membrane, when used as a separation membrane, may show a low separation efficiency. Here, the thickness of the zeolite membrane is a value obtained by observation using a scanning electron microscope (SEM). Since such a thin membrane can be formed, a separation membrane can be obtained which has little defects, has a uniform thickness, is dense, and has a high separation ability.

Figure 1:
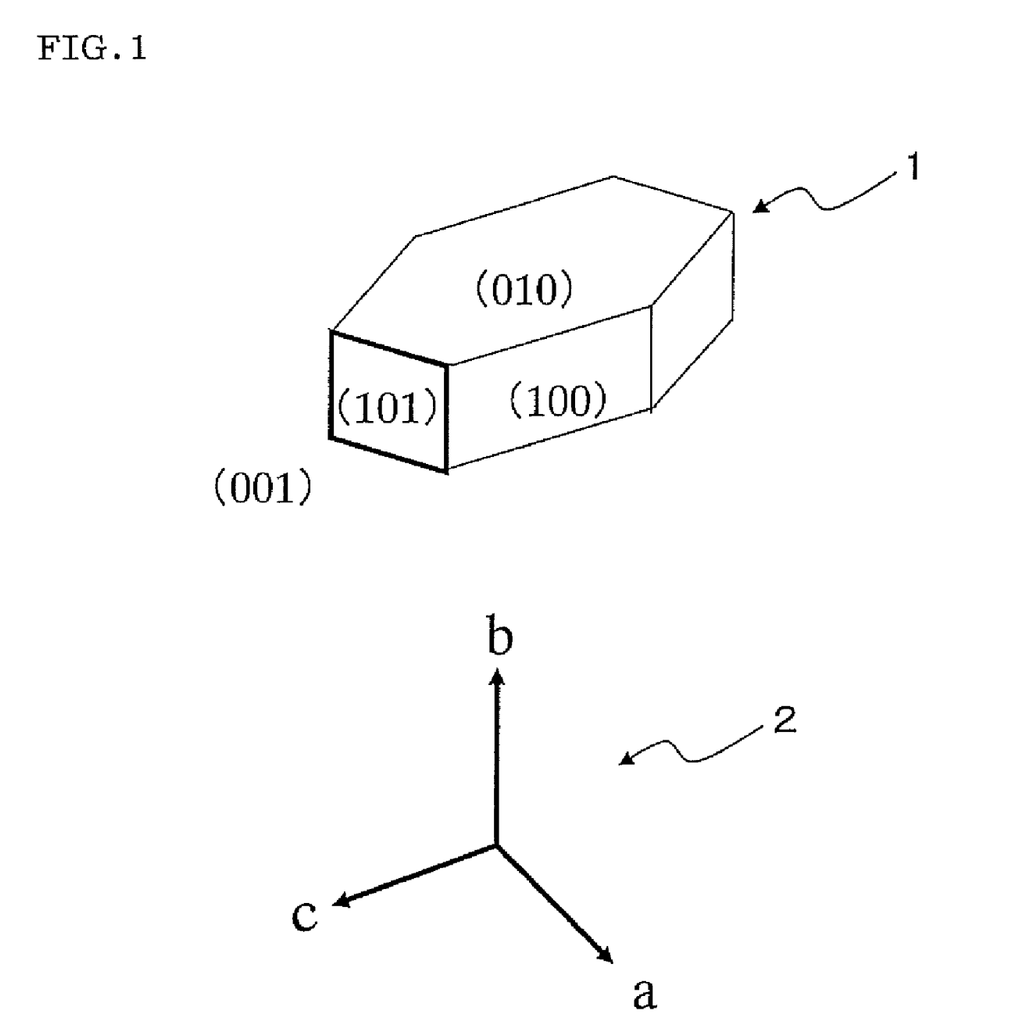
FIG. 1 is a perspective view schematically showing an MFI type zeolite crystal.
Figure 2:
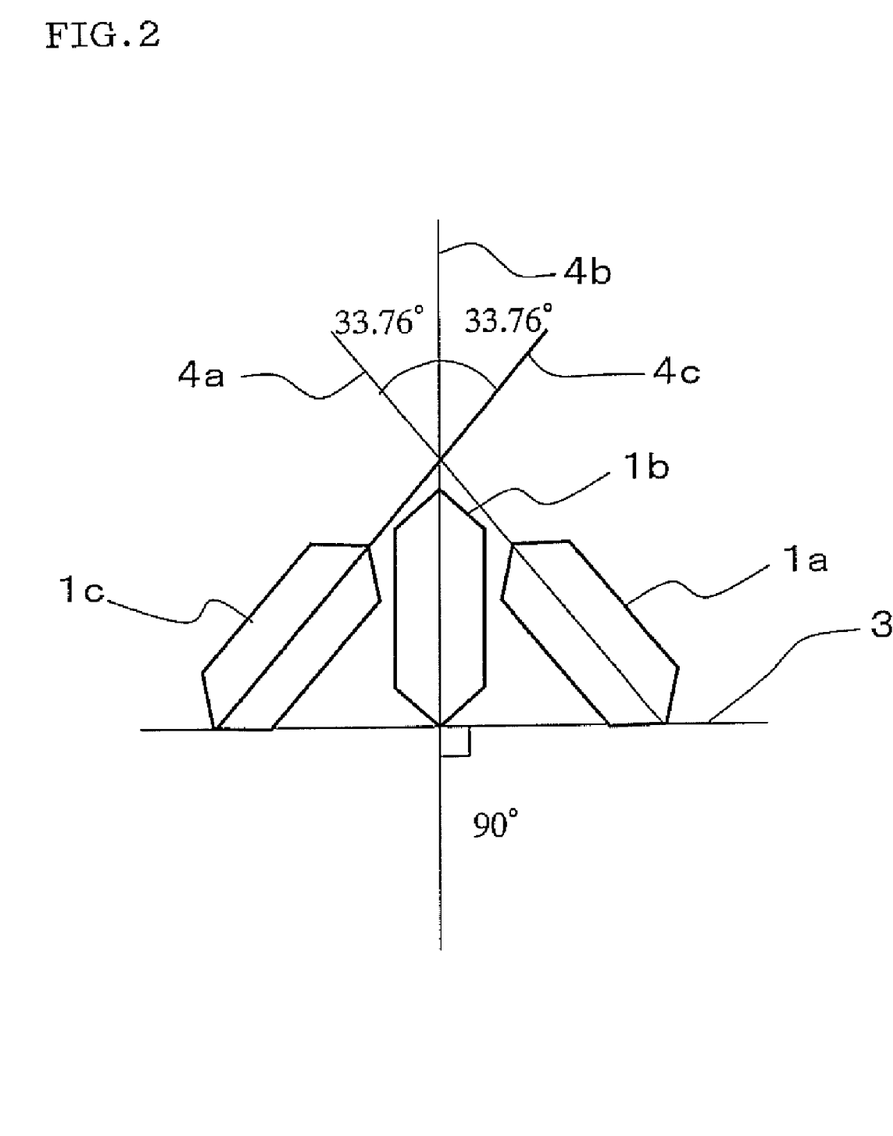
FIG. 2 is a schematic view showing a state in which MFI type zeolite crystals are oriented in particular directions relative to a plane parallel to the surface of zeolite membrane, i.e. a membrane surface.

In the zeolite membrane obtained, it is preferred that the c-axis of each zeolite crystal is oriented in a direction vertical to the surface of the support (c-axis orientation) and that the ratio of zeolite crystals of c-axis orientation is as high as possible. Specifically explaining, it is preferred that 90% or more of the zeolite crystals constituting the zeolite membrane are in c-axis orientation. Being in c-axis orientation, the zeolite membrane can be preferably used as a separation membrane for separating ethanol from a mixed solution of water and ethanol by pervaporation (permeation). Here, c-axis orientation of zeolite membrane refers to a state in which the c-axis of zeolite membrane is oriented not only at an angle of 90° but also at an angle range of 90°±33.76° relative to the surface of the support. FIGS. 1 and 2 explain an MFI type zeolite crystal and a state of c-axis orientation. FIG. 1 is a perspective view schematically showing each crystal face in the abc crystal axis system 2 of MFI type zeolite crystal 1. FIG. 2 is a schematic view showing a state in which MFI type zeolite crystal are oriented in particular directions relative to the surface 3 of a support. In an MFI type zeolite crystal 1a, the angle formed by the c-axis 4a and the support surface 3 is 90°+33.76° and the 101 crystal face of the crystal 1a is arranged in parallel to the support surface 3. In an MFI type zeolite crystal 1c, the angle formed by the c-axis 4c and the support surface 3 is 90°−33.76° and the 101 crystal face of the crystal 1c is arranged in parallel to the support surface 3. Here, "90°+33.76°" and "90°−33.76°" are in a relative relation, and the angle formed by the c-axis 4a and the support surface 3 may be 90°−33.76° and the angle formed by the c axis 4c and the support surface 3 may be 90°+33.76°. In an MFI type zeolite crystal 1b, the angle formed by the c axis 4b and the support surface 3 is 90° and the 001 crystal face of the crystal 1b is arranged in parallel to the support surface 3. The orientation of zeolite crystal can be measured by X-ray diffraction. The zeolite membrane obtained by the present production process can be used for separation not only from a mixed solution of water and ethanol but also from a mixture containing other low-molecular substances.

After the formation of a zeolite membrane on the surface of a support by a hydrothermal synthesis, the support is preferably washed by boiling water. Thereby, adhesion of excessive zeolite crystal on the zeolite membrane can be prevented. The time of washing is not particularly restricted but it is preferred to repeat washing of 0.5 to 3 hours 1 to 5 times. After the washing, it is preferred to conduct drying at 60 to 120° C. for 4 to 48 hours.

Next, the zeolite membrane formed on the support surface by the above method is subjected to a heat treatment (activation treatment) to remove tetrapropylammonium to obtain a final zeolite membrane. The temperature of the heating is preferably 400 to 600° C. and the time of the heating is preferably 1 to 60 hours. As the apparatus used for the heating, an electric furnace or the like can be mentioned.

(3) Membrane Growth Step

The process for production of zeolite membrane according to the present embodiment preferably comprises, after the membrane formation step (2), at least one membrane growth step in which the zeolite membrane formed on the support surface is allowed to grow further. Particularly when the support has a monolithic shape and a zeolite membrane is formed on the surface of each channel, the silica component contained in the membrane-forming sol may be insufficient in the channel and the membrane formation step (2) alone may not be sufficient. In such a case, a membrane growth step is conducted after the membrane formation step (2), whereby a zeolite membrane of intended thickness can be formed. The membrane growth step may be conducted two or more times.

The membrane growth step is preferably conducted in the same operation as in the "membrane formation step (2)" except that, in the "membrane formation step (2)", "the support obtained in the seed forming step (1), having a zeolite seed crystal formed on the surface" is replaced by "the support obtained in the membrane formation step (2), having a zeolite membrane formed on the surface".

EXAMPLES

The present invention is described more specifically below by way of Examples. However, the present invention is in no way restricted by these Examples.

Example 1

(Preparation of Seeding Sol)

36.17 g of a 40 mass % tetrapropylammonium hydroxide solution (produced by SACHEM) was mixed with 18.88 g of tetrapropylammonium bromide (produced by Wako Pure Chemical Industries, Ltd.). Thereto were added 82.54 g of distilled water and 95 g of an about 30 mass % silica sol [Snowtex S (trade name), produced by Nissan Chemical Industries, Ltd.]. They were stirred at room temperature for 30 minutes using a magnetic stirrer, to prepare a seeding sol.

(Generation of Zeolite Seed Crystal)

Figure 3:
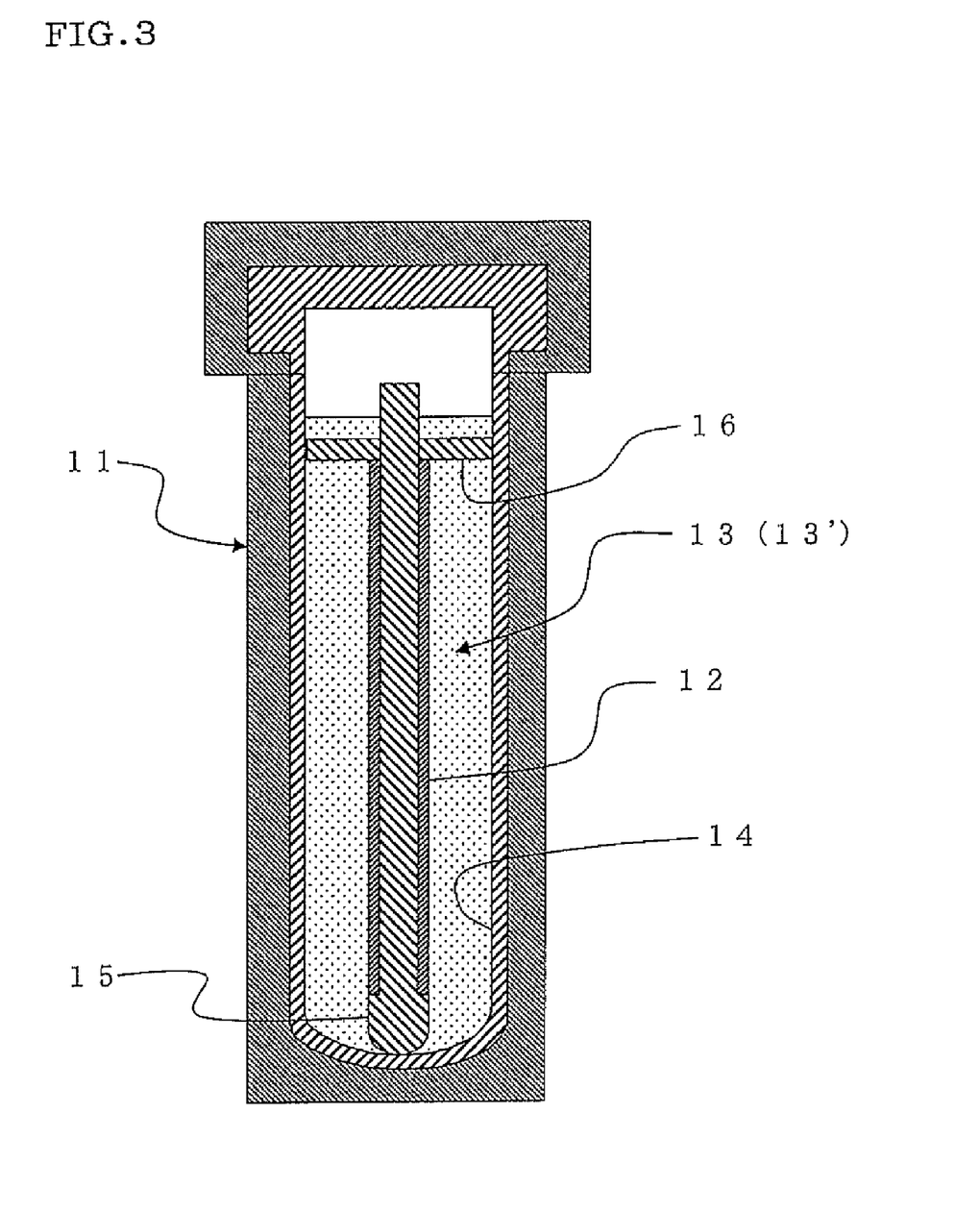
FIG. 3 is a sectional view schematically showing a state in which a support and a silica sol are put in a pressure-resistant vessel in Example 1.
Figure 4:
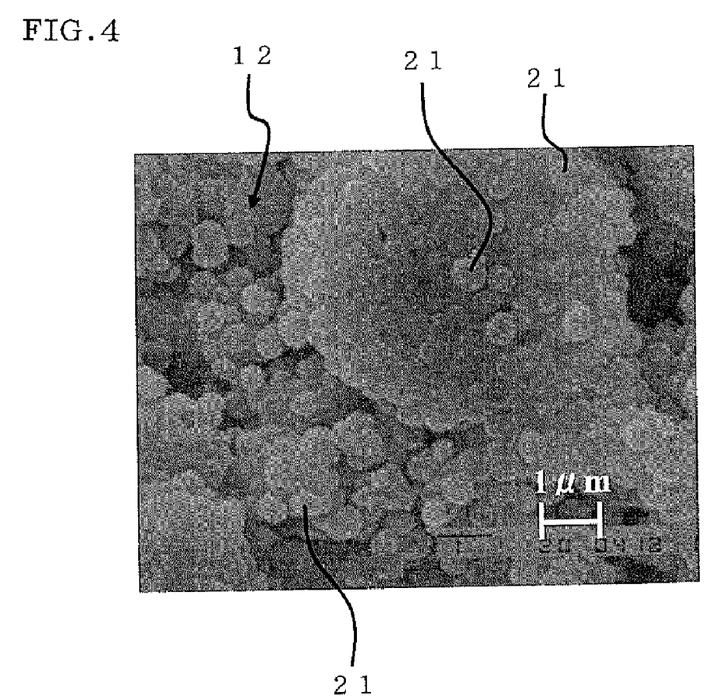
FIG. 4 is a SEM photograph showing a state in which zeolite seed crystals are precipitated on a support in Example 1.

As shown in FIG. 3, the seeding sol 13 obtained was placed in a 300-ml, stainless steel-made, pressure-resistant vessel 11 having inside a fluoroplastic-made inner cylinder 14, and a cylindrical, porous alumina support 12 (12 mm in diameter, 1 to 2 mm in thickness and 160 mm in length) was immersed therein. A reaction was allowed to take place for 10 hours in a hot-air drier of 110° C. The alumina support 12 was fixed inside the pressure-resistant vessel 11 using fixation jigs 15 and 16. The support after the reaction was washed by boiling, five times and then dried at 80° C. for 16 hours. The surface of the support after the reaction was observed with a scanning electron microscope (SEM). As a result, as shown in a scanning electron microscope (SEM) photograph of FIG. 4, the whole surface of the porous alumina support 12 was covered with zeolite crystals (a zeolite seed crystal 21 of about 0.5 µm), with no open area. The X-ray diffraction of crystal particles confirmed that the zeolite seed crystal 21 was an MFI type zeolite.

(Preparation of Membrane-Forming Sol)

0.66 g of a 40 mass % tetrapropylammonium hydroxide solution (produced by SACHEM) was mixed with 0.34 g of tetrapropylammonium bromide (produced by Wako Pure Chemical Industries, Ltd.). Thereto were added 229.6 g of distilled water and 5.2 g of an about 30 mass % silica sol [Snowtex S (trade name), produced by Nissan Chemical Industries, Ltd.]. They were stirred at room temperature for 30 minutes using a magnetic stirrer, to prepare a membrane-forming sol.

(Formation of Zeolite Membrane)

Figure 5:
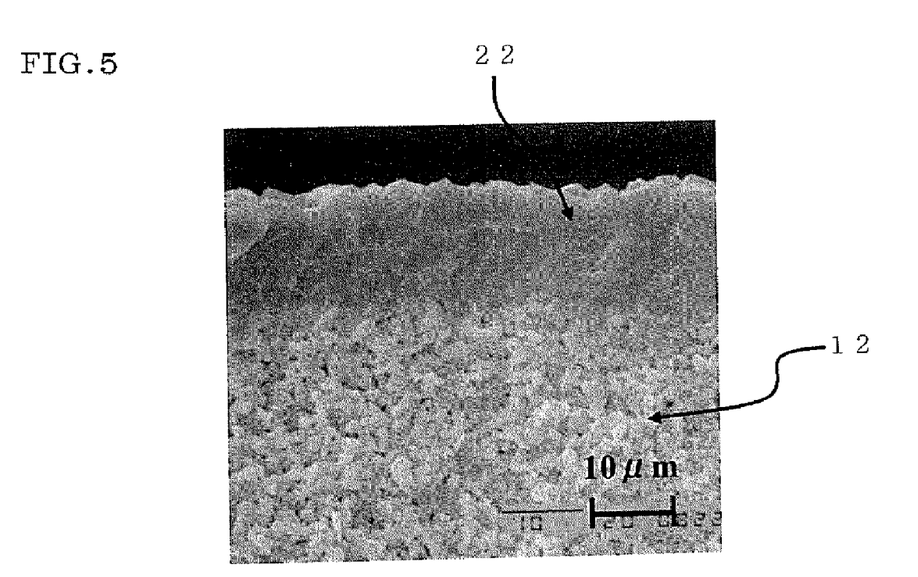
FIG. 5 is a sectional SEM photograph showing a state in which a zeolite membrane is formed on a support in Example 1.
Figure 7:
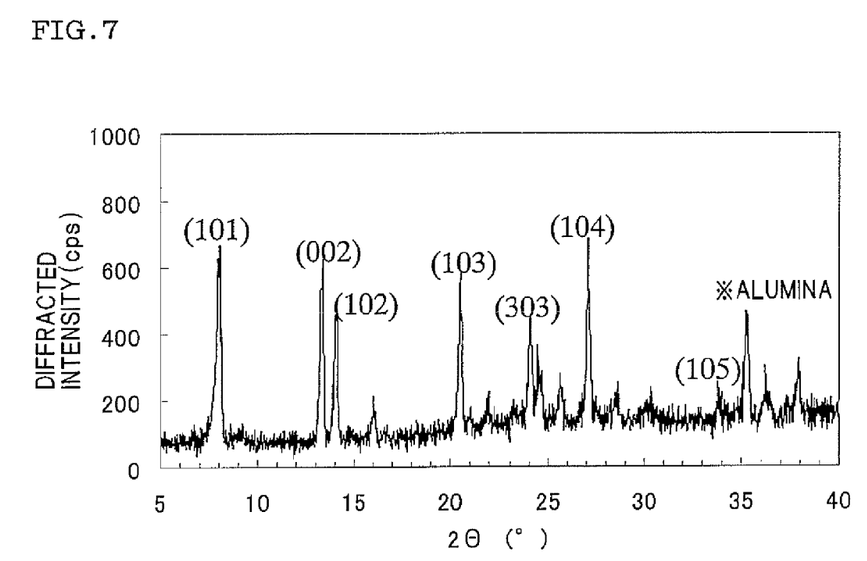
FIG. 7 is an XRD pattern of a membrane obtained in Example 1.

The membrane-forming sol 13' obtained was placed in a 300-ml, stainless steel-made, pressure-resistant vessel 11 having inside a fluoroplastic-made inner cylinder 14, such as shown in FIG. 3, as in the above case of "forming of zeolite seed crystal". The porous alumina support 12 on which the zeolite seed crystal precipitated, was immersed therein. A reaction was allowed to take place for 60 hours in a hot-air drier of 180° C. The support after the reaction was washed by boiling, 5 times and then dried at 80° C. for 16 hours. The section of the surface portion of the support after the reaction was observed using a scanning electron microscope (SEM). As a result, a dense layer (zeolite membrane) 22 of about 13 µm in thickness was present on the surface of the porous alumina support 12, as shown in a scanning electron microscope (SEM) photograph of FIG. 5. This dense layer was subjected to analysis by X-ray diffraction (XRD) (FIG. 7) under the conditions shown below. As a result, the dense layer was confirmed to be an MFI type zeolite crystal. Since the diffracted intensity of the peak derived from c-axis orientation was high, it was also found that there was obtained a membrane having c-axis orientation in a direction vertical to the surface of the support. Here, FIG. 7 is an XRD pattern of the membrane obtained.

The MFI type zeolite membrane of c-axis orientation, formed on the porous alumina support was heated to 500° C. in an electric furnace and kept at that temperature for 4 hours, to remove tetrapropylammonium to obtain a zeolite membrane.

Example 2

(Preparation of Seeding Sol)

33.32 g of a 40 mass % tetrapropylammonium hydroxide solution (produced by SACHEM) was mixed with 17.45 g of tetrapropylammonium bromide (produced by Wako Pure Chemical Industries, Ltd.). Thereto were added 76.17 g of distilled water and 87.5 g of an about 30 mass % silica sol [Snowtex S (trade name), produced by Nissan Chemical Industries, Ltd.]. They were stirred at room temperature for 30 minutes using a magnetic stirrer, to prepare a seeding sol.
(Formation of Zeolite Seed Crystal)

Figure 11:
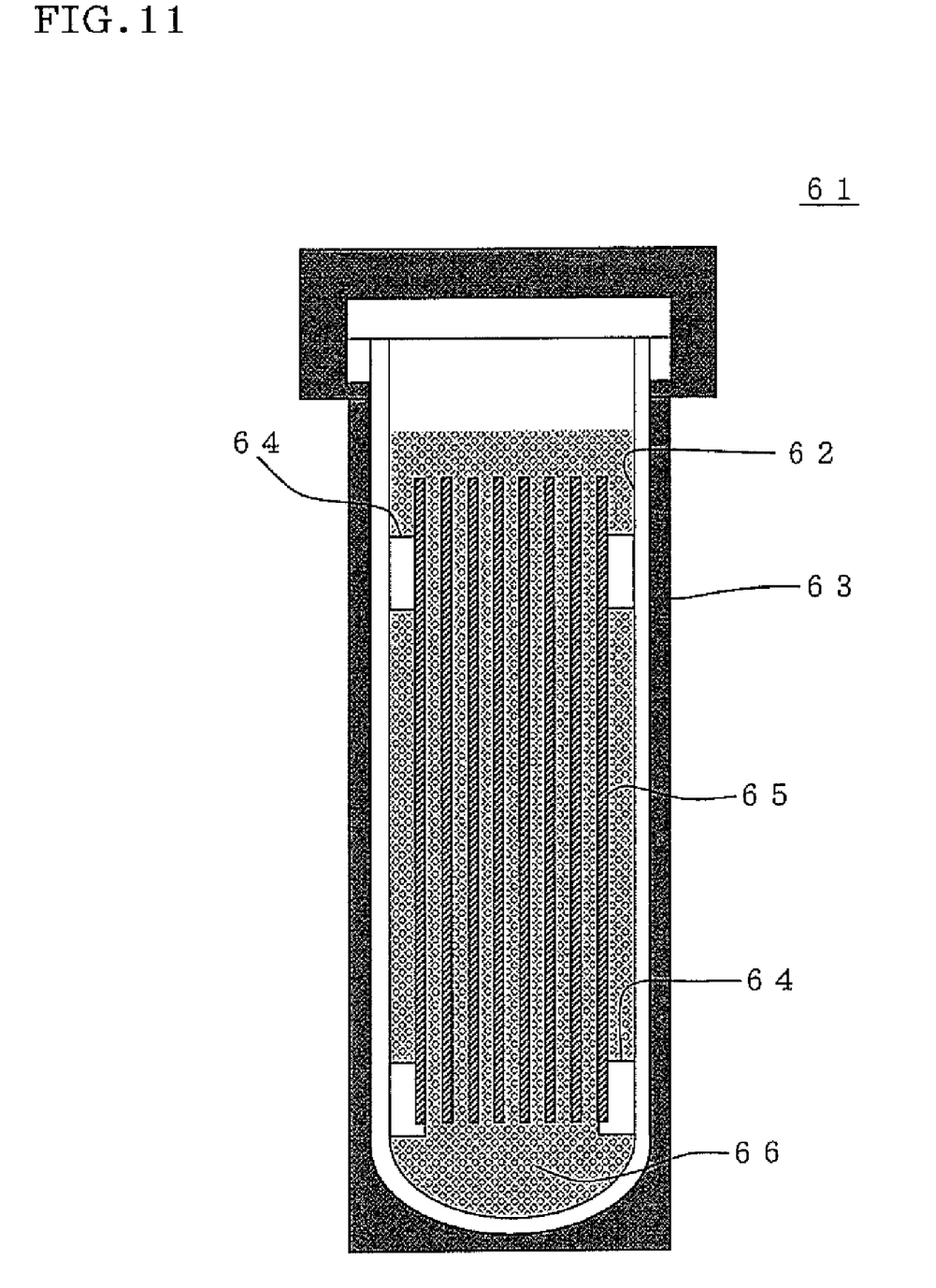
FIG. 11 is a sectional view showing a state in which a support is fixed to a pressure-resistant vessel and a seeding sol or a membrane-forming sol is put in the vessel, in Example 2.
Figure 12:
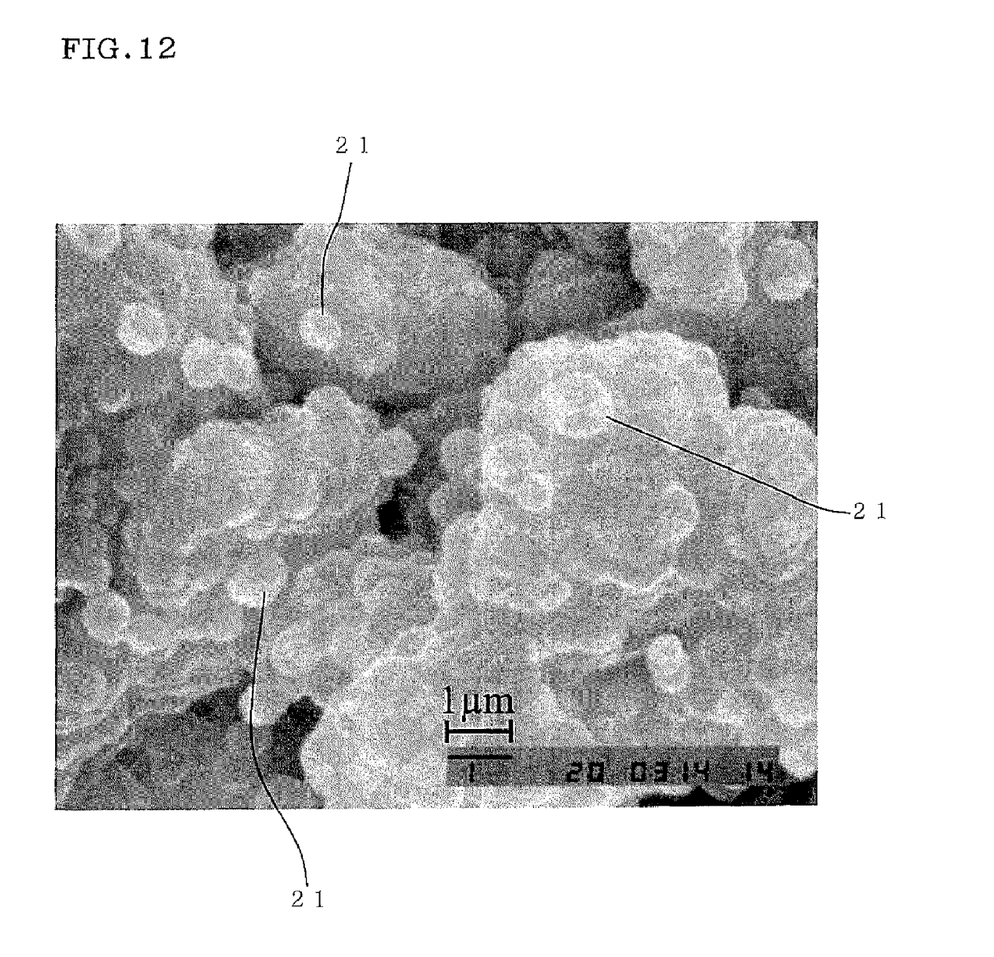
FIG. 12 is a SEM photograph showing a state in which zeolite seed crystals are precipitated on a support in Example 2.

As shown in FIG. 11, the above-obtained seeding sol 66 was placed in a 300-ml, stainless steel-made, pressure-resistant vessel 61 formed by providing a fluoroplastic-made inner cylinder 62 inside a stainless steel vessel 63. Therein was immersed a monolithic, porous alumina support 65 having a diameter of 30 mm, a cell (channel) inner diameter of 3 mm, 37 cells (channels) and a length of 180 mm, whose outer circumference was covered with a fluoroplastic-made tape (see FIG. 10). A reaction was allowed to take place for 12 hours in a hot-air drier of 110° C. FIG. 11 is a sectional view showing a state in which a support is fixed to a pressure-resistant vessel and a seeding sol or a membrane-forming sol is placed in the vessel, in Example 2. The alumina support 65 was fixed to the pressure-resistant vessel 61 using a fluoroplastic-made fixation jig 64. The support after the reaction was washed by boiling and then dried at 80° C. overnight. The surface of the support after the reaction was observed with a scanning electron microscope (SEM). As a result, as shown in a scanning electron microscope (SEM) photograph of FIG. 12, the whole surface of the porous alumina support was uniformly covered with MFI crystalline particles or grains (zeolite seed crystals 21) of about 0.5 μm. FIG. 12 is an SEM photograph showing a state in which a zeolite seed crystal is precipitated on a support.
(Preparation of Membrane-Forming Sol)

0.84 g of a 40 mass % tetrapropylammonium hydroxide solution (produced by SACHEM) was mixed with 0.44 g of tetrapropylammonium bromide (produced by Wako Pure Chemical Industries, Ltd.). Thereto were added 202.1 g of distilled water and 6.58 g of an about 30 mass % silica sol [Snowtex S (trade name), produced by Nissan Chemical Industries, Ltd.]. They were stirred at room temperature for 30 minutes using a magnetic stirrer, to prepare a membrane-forming sol.
(Formation of Zeolite Membrane)

The membrane-forming sol obtained was placed in a 300-ml, stainless steel-made, pressure-resistant vessel having inside a fluoroplastic-made inner cylinder, such as shown in FIG. 11, as in the above case of "forming of zeolite seed crystal". The porous alumina support on which the zeolite seed crystal precipitated, was immersed therein. A reaction was allowed to take place for 24 hours in a hot-air drier of 160° C. The support after the reaction was washed by boiling and then dried at 80° C. overnight.

(Growth of Zeolite Membrane)

Figure 13:
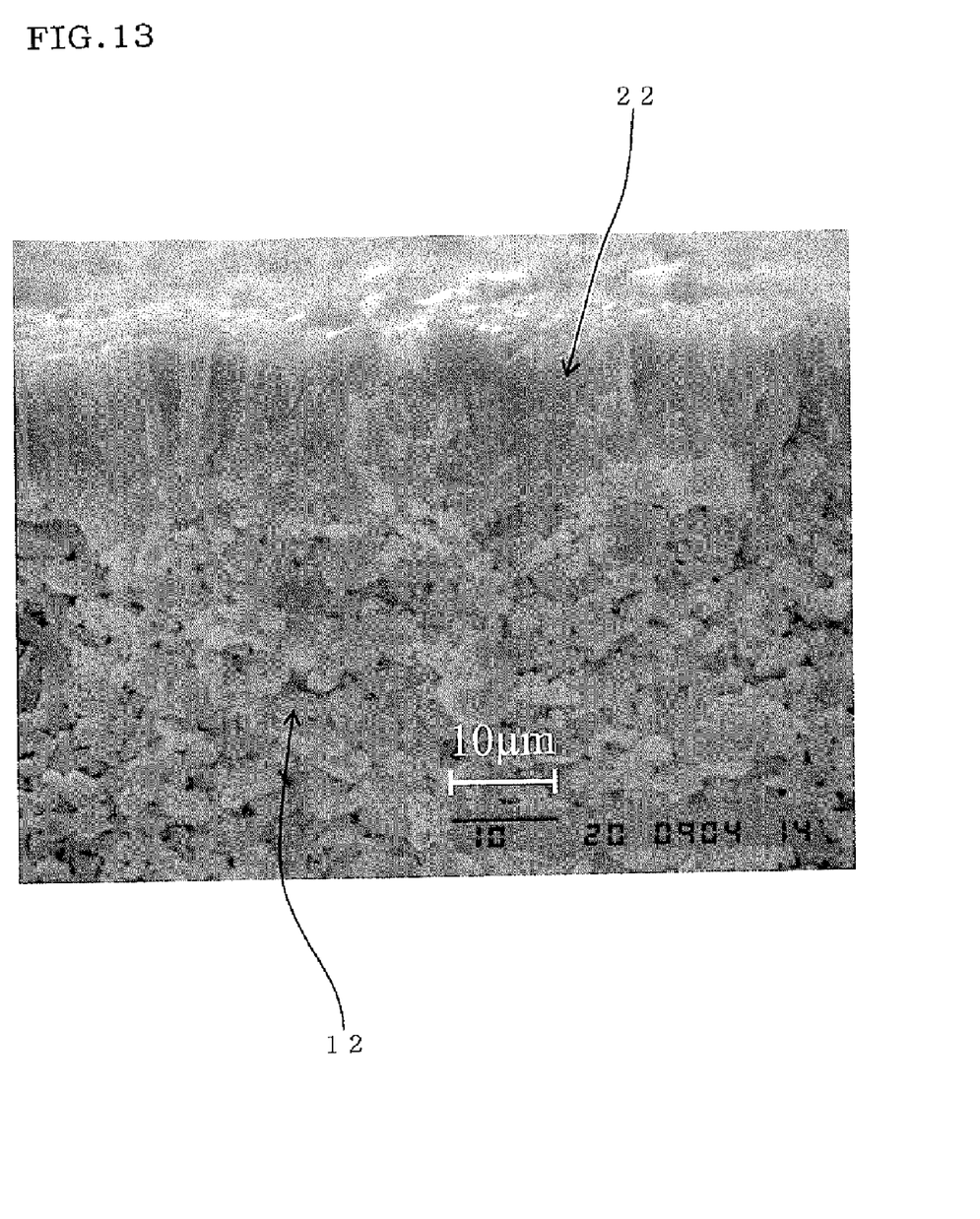
FIG. 13 is a sectional SEM photograph showing a state in which a zeolite membrane is formed on a support in Example 2.

After the above operation for formation of zeolite membrane, an operation for growth of zeolite membrane (a step for membrane growth) was conducted. In the membrane growth step, membrane growth was conducted in the same manner as in the "formation of zeolite membrane", using "the support after the reaction" obtained in the "formation of zeolite membrane" and also using the same "membrane-forming (membrane-growing) sol" as the "membrane-forming sol" used in the "formation of zeolite membrane". The membrane growth step was conducted only once. The section of the surface portion of the support after the membrane growth was observed using a scanning electron microscope (SEM). As a result, a dense layer (a zeolite membrane 22) of about 12 μm in thickness had been formed on the surface of a porous alumina support 12, as shown in FIG. 13 [a scanning electron microscope (SEM) photograph]. FIG. 13 is a sectional SEM photograph showing a state in which a zeolite membrane is formed on a support. The dense layer was analyzed by X-ray diffraction (XRD) which confirmed that the dense layer was an MFI type zeolite crystal. Since the diffracted intensity of the peak derived from c-axis orientation was high, it was found that there was obtained a membrane having c-axis orientation in a direction vertical to the surface of the support. The MFI type zeolite membrane obtained was heated to 500° C. in an electric furnace and kept at that temperature for 4 hours, to remove tetrapropylammonium to obtain a zeolite membrane.

Comparative Example 1

18.75 g of a 40 mass % tetrapropylammonium hydroxide solution (produced by SACHEM) was mixed with 9.78 g of tetrapropylammonium bromide (produced by Wako Pure Chemical Industries, Ltd.). Thereto were added 180.46 g of distilled water and 30 g of an about 30 weight % silica sol [Snowtex S (trade name), produced by Nissan Chemical Industries, Ltd.]. They were stirred at room temperature for 30 minutes using a magnetic stirrer, to prepare a membrane-forming sol. The sol was placed in a 300-ml, stainless steel-made, pressure-resistant vessel having inside a fluoroplastic-made inner cylinder, and a porous alumina support of 12 mm in diameter, 1 to 2 mm in thickness and 160 mm in length was immersed therein. A reaction was allowed to take place for 30 hours in a hot-air drier of 160° C. The support after the reaction was washed with hot water five times and then dried at 80° C. for 16 hours.

Figure 6:
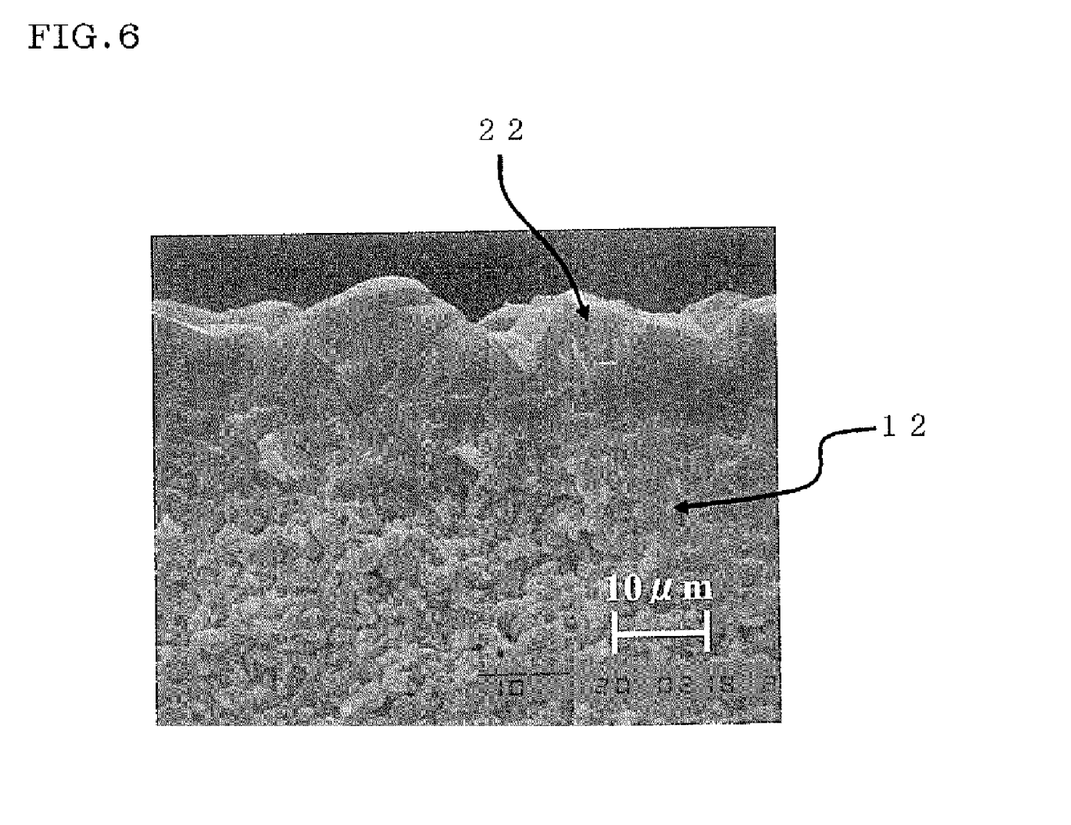
FIG. 6 is a sectional SEM photograph showing a state in which a zeolite membrane is formed on a support in Comparative Example 1.
Figure 8:
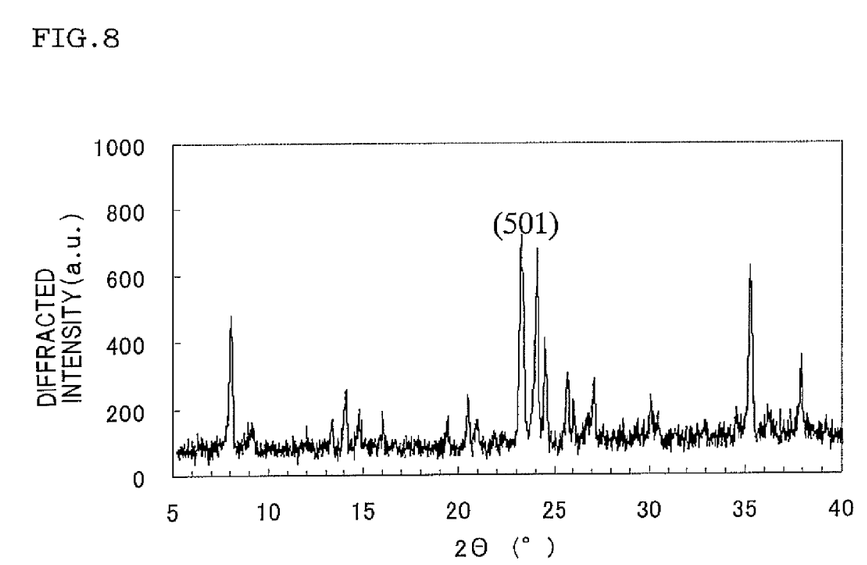
FIG. 8 is an XRD pattern of a membrane obtained in Comparative Example 1.

The section of the surface portion of the support of Comparative Example 1 having a zeolite membrane formed thereon was observed using a scanning electron microscope (SEM). As a result, as shown in FIG. 6 [a scanning electron microscope (SEM) photograph], there had been formed, on the surface of the porous alumina support 12, it has been formed that the formed zeolite membrane 22 was non-uniform in its thickness due to uneven surface. This zeolite membrane was analyzed by X-ray diffraction (FIG. 8) under the conditions shown later, which confirmed that the zeolite membrane was an MFI type zeolite crystal. The (501) face peak showed the highest diffracted intensity, which was largely different from c-axis orientation. FIG. 8 shows the XRD pattern of the membrane obtained.

Using the zeolites membrane obtained in Example 1 and Comparative Example 1, a test (a permeation test) was conducted by the following method (pervaporation), for separation of ethanol from a mixed solution of water and ethanol. In the mixed solution of water and ethanol, the content of ethanol was 10% by volume.

(X-Ray Diffraction)

a Powder X-Ray Diffraction (XRD) Pattern was Obtained by using Mini Flex produced by (KK) Rigaku, under the conditions of CuK$_\alpha$ (X-ray source), 30 kV (tube current), 15 mA (tube voltage), Ni (filter) and 4°/min (scanning speed)

(Pervaporation Test)

Figure 9:
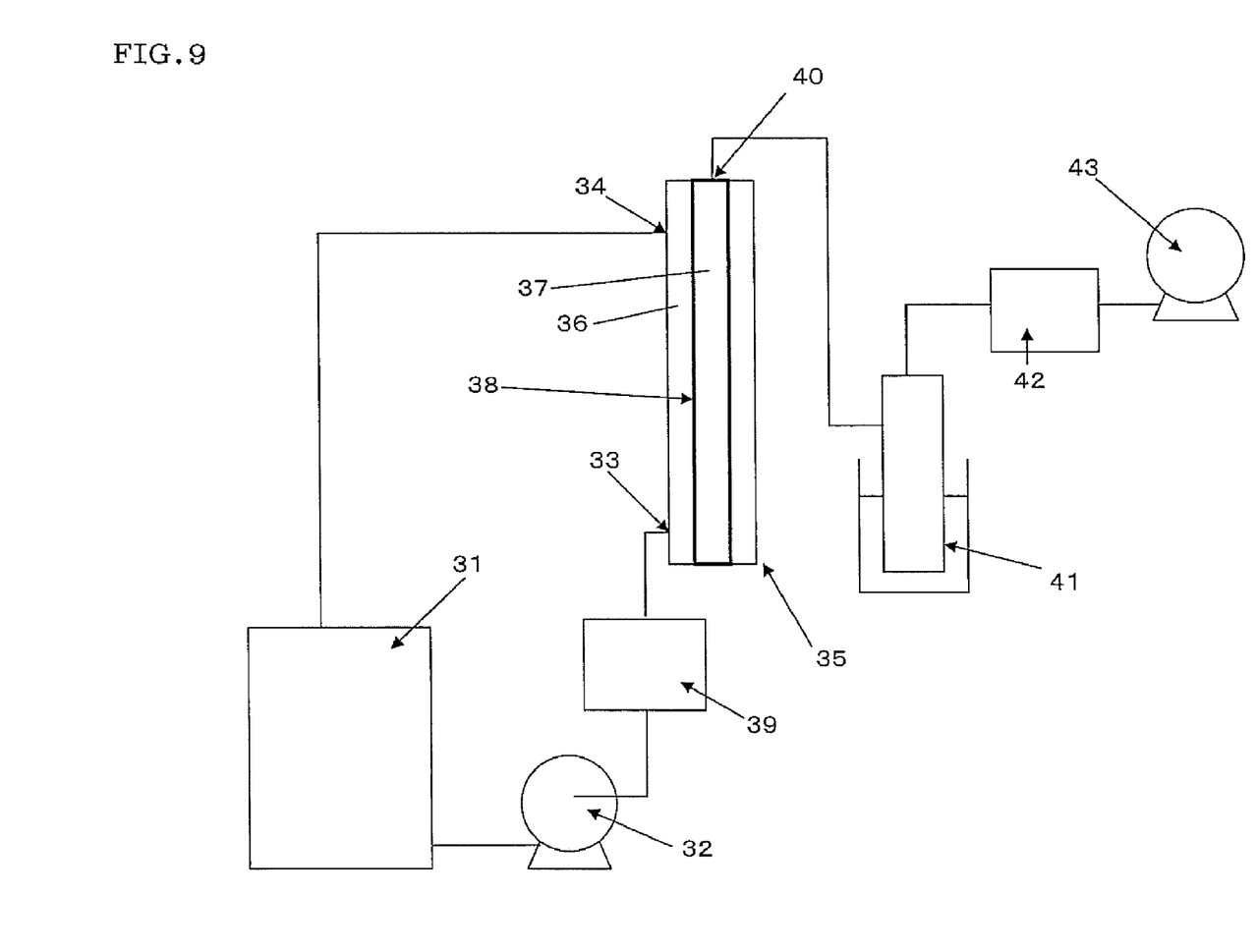
FIG. 9 is a schematic drawing showing an entire apparatus for conducting a pervaporation test.

FIG. 9 is a schematic drawing showing an entire apparatus for conducting a pervaporation test. As shown in FIG. 9, an aqueous solution containing 10 volume % of ethanol, put in a raw material tank 31 is heated to about 70° C. The raw material is fed from a feed solution inlet 33 to a raw material side space 36 of a SUS (stainless steel)-made module 35 by a feeding pump 32 and the raw material discharged from a feed solution outlet 34 is returned to the raw material tank 31, whereby the raw material is circulated. The flow amount of the raw material is confirmed by a flow meter 39. By reducing the pressure of a space 37 behind a support of a zeolite membrane 38 by a vacuum pump 43, a vapor is allowed to permeate the zeolite membrane 38. The vapor after permeation is discharged from an outlet 40 of vapor after permeation and recovered in a liquid N$_2$ trap 41. The vacuum of the space 37 behind membrane support is controlled by a pressure regulator 42. In the SUS-made module 35, the inner space is divided by the zeolite membrane 38 into the raw material side space 36 and the space 37 behind membrane support; the feed solution inlet 33 and the feed solution outlet 34 are formed so as to communicate with the raw material side space 36; and the outlet 40 of after-permeation vapor for discharging outside the after-permeation vapor is formed at the top of the space 37 behind membrane support. In FIG. 9, the SUS module 35 has such a structure that there is fitted, in a cylindrical, SUS-made, outer case, a cylindrical zeolite membrane provided on the outer surface of a cylindrical support (not shown). The mass of the liquid obtained was weighed by an electronic balance and the composition of the liquid was analyzed by gas chromatography.

The separation coefficient and permeation flux (kg/m$^2$/hour), obtained in the pervaporation test are shown in Table 1. Here, the separation coefficient is, as shown in the following formula, a value obtained by dividing a ratio of ethanol concentration (volume %) and water concentration (volume %) in solution after permeation, by a ratio of ethanol concentration (volume %) and water concentration (volume %) in feed solution. The permeation flux is a mass of all substances which permeated a separation membrane per unit time (hour) and unit area (m$^2$).

Separation coefficient=[(ethanol concentration in after-permeation solution)/(water concentration in after-permeation solution)]/[(ethanol concentration in feed solution)/(water concentration in feed solution)]

TABLE 1

| | Separation coefficient | Permeation flux (kg/m$^2$ · hour) |
|---|---|---|
| Example 1 | 69 | 3.92 |
| Comparative Example 1 | 53 | 1.38 |

It is appreciated from Table 1 that the zeolite membrane obtained in Example 1 has high values in any of separation coefficient and permeation flux.

INDUSTRIAL APPLICABILITY

The present invention is applicable to production of a separation membrane used for separation of a particular substance from a mixture of low-molecular substances and particularly to production of a separation membrane capable of separating ethanol at a high efficiency from a mixed solution of ethanol and water.

The invention claimed is:

1. A process for producing a zeolite membrane, which comprises
    a seed crystal forming step of placing, in a pressure-resistant vessel, a seeding sol containing silica, water and a structure-directing agent and a support in a state that the support is immersed in the seeding sol and heating the heat-resistant vessel to form a zeolite seed crystal on the surface of the support, and
    a membrane formation step of allowing the zeolite seed crystal to grow to form a zeolite membrane on the surface of the support,
    wherein, in the seed crystal fanning step, the molar ratio of water/silica in the seeding sol is set at water/silica of from 10 to 50 and the heating of the pressure-resistant vessel is conducted at a temperature of from 90 to 130° C.

2. A process for producing a zeolite membrane according to claim 1, wherein, in the seed crystal forming step, the pressure-resistant vessel is heated for 3 to 18 hours.

3. A process for producing a zeolite membrane according to claim 1, wherein, in the seed crystal forming step, the zeolite seed crystal obtained has particle diameters of 1 μm or less.

4. A process for producing a zeolite membrane according to claim 1, wherein the zeolite membrane has a thickness of 1 to 30 μm.

5. A process for producing a zeolite membrane according to claim 1, wherein the zeolite membrane is composed of an MFI type zeolite.

6. A process for producing a zeolite membrane according to claim 1, wherein the crystal c-axis of the membrane is oriented to a direction vertical to the surface of the support.

7. A process for producing a zeolite membrane according to claim 1, wherein the support is a columnar, porous material in which a plurality of channels are formed in parallel in the axial direction and the seed crystal forming step is a step of forming a zeolite seed crystal on the surfaces of the channels.

8. A process for producing a zeolite membrane according to claim 1, which comprises, after the membrane formation step, at least one step for membrane growth which allows the zeolite membrane formed on the surface of the support, to grow further.

* * * * *

UNITED STATES PATENT AND TRADEMARK OFFICE
CERTIFICATE OF CORRECTION

PATENT NO. : 7,973,090 B2
APPLICATION NO. : 12/118911
DATED : July 5, 2011
INVENTOR(S) : Kenji Suzuki et al.

Page 1 of 1

It is certified that error appears in the above-identified patent and that said Letters Patent is hereby corrected as shown below:

Column 14

*Line 25*: please change "fanning" to --forming--

Signed and Sealed this
Eleventh Day of October, 2011

David J. Kappos
*Director of the United States Patent and Trademark Office*